April 4, 1967 R. P. MULDOON 3,312,863

TRANSIENT ELECTRIC ENERGY SENSOR WITH ZENER AND PARALLEL PROTECTIVE RELAY

Filed July 25, 1963 2 Sheets-Sheet 1

INVENTOR.
ROBERT P. MULDOON
BY William D. Carothers
HIS ATTORNEY

INVENTOR.
ROBERT P. MULDOON
BY William D. Carothers
HIS ATTORNEY

United States Patent Office 3,312,863
Patented Apr. 4, 1967

3,312,863
TRANSIENT ELECTRIC ENERGY SENSOR WITH ZENER AND PARALLEL PROTECTIVE RELAY
Robert P. Muldoon, Indiana, Pa., assignor to Link-Belt Company, a corporation of Illinois
Filed July 25, 1963, Ser. No. 297,601
2 Claims. (Cl. 317—22)

This invention relates generally to protective equipment for semiconductors or protective equipment for any type of load whether operated in an A.C. or D.C. circuit such as electronic tubes, electric motors and electrically operated mechanisms, and more particularly to the use of an avalanche diode connected in parallel with a semiconductor feeding a load, or connected in parallel with a load and semiconductor feeding the load, or in parallel with any other type of load and these combinations each being in parallel with a relay having a contact connected to open the supply circuit of the semiconductor or loading including the circuit of the avalanche diode and the relay.

An avalanche diode for use in this invention is chosen for its dependability in functioning at a specific reverse voltage by allowing a sharp increase in reverse current through the diode. The specific reverse voltage on this diode causes an avalanche in back current. This avalanche of back current will reduce the voltage across the operating coil of a relay in parallel with this avalanche diode which relay has contacts that open the primary circuit feeding the power circuit together with a contact in the relays own operating circuit. This permits the circuit to be opened within one cycle and before the back current surge has ended.

Since the relay circuit is opened then some means must be provided not only to restore this circuit but also the power circuit of a semiconductor feeding a load or the circuit of any load. This may be accomplished by a mere hand lever to lift the relay armature and close its contacts. This relay may have an independent source of power which re-energizes the relay by push button. This relay may have a timer with multiple contacts connected in multiple with the relay contacts and initially cycled through a back contact of the relay it is to re-energize. The timer actually closes the circuits after its pre-selected passage of time and the closing of the circuits places the relay back in service and upon being energized it de-energizes the timer. This forms a very simple and effective protective and restorative system.

With the load and the semiconductor functioning in combination with the load whether the semiconductor is to be the component protected or the full load per se is to be protected, one can select the proper value of avalanche voltage. The proper rating of the avalanche diode is determined by the protective requirements of the semiconductor or the load, whichever is being protected.

If the line voltage is 220 volts R.M.S., the peak voltage would be 309 volts for a sine wave. Allowing for normal line fluctuations of ten percent, this peak voltage could rise to 340 volts. To prevent damage to a load whose rating is no more than normal peak voltage from these normal fluctuations, an avalanche diode rated to avalanche at around 310 volts would readily protect the load.

As a further example suppose the load is rated at 500 volts maximum. A diode rated at 400 volts avalanche will readily protect the load. When the transient voltage exceeds 400 volts, the avalanche diode will conduct current, shunting generally all the current to the relay which in turn causes the complete circuit to the load to be opened. The protective fuse action has thus occurred.

Thus the principal object of this invention is the placing of a silicon avalanche diode in a circuit as a fuse to protect components or the complete circuit against overload currents due to voltage transients. Many circuit variations employing a silicon avalanche diode to achieve this goal are possible and those shown are by the way of exemplification.

Other objects and advantages of this invention appear hereinafter in the following description and claims.

The accompanying drawings show for the purpose of exemplification without limiting this invention or the claims thereto certain practical embodiments illustrating the principles of this invention wherein;

Figure 1:
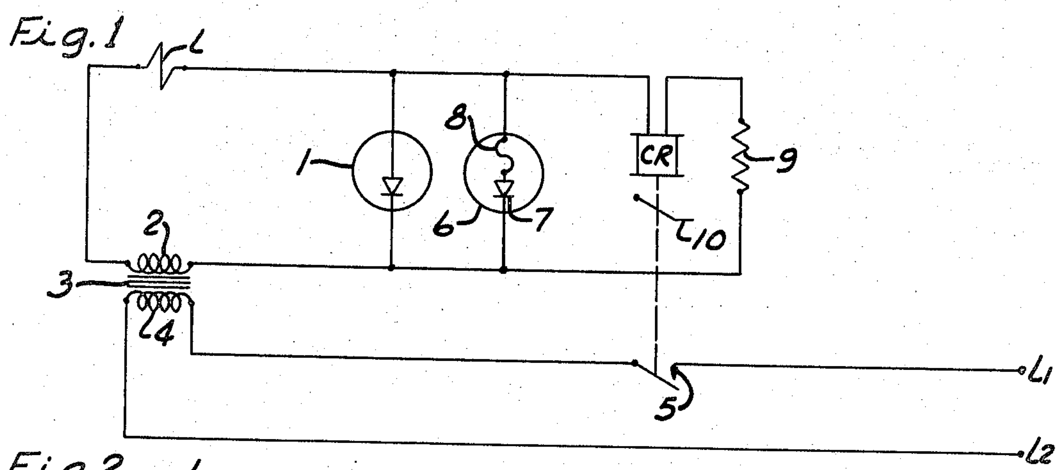
FIG. 1 is a circuit diagram of an avalanche diode having an internal series fuse and connected in parallel with a power semiconductor and a hand reset relay.

Referring to FIG. 1 of the drawings the load indicated at L is connected in series with the power rectifier or semiconductor 1 which completes the secondary circuit through the secondary winding 2 in the transformer 3, the primary 4 of which is connected to lines 1 and 2 through the front contacts 5 of the CR relay.

The avalanche diode 6 is provided with an ordinary avalanche semiconductor 7 and the lead thereof is provided with a fuse 8. The avalanche diode 7 is selected to provide a very low back current for a back voltage up to a predetermined amount. When the back voltage reaches the predetermined amount, the avalanche diode 6 will allow a very large amount of current to pass in the reverse direction which reduces the normally high back up voltage on this diode. This reduction in current is sufficient to drop the voltage so that the CR relay becomes de-energized and opens its contact 5. The CR relay together with the resistor 9, which is connected in series with the operating coil thereof, is also connected in parallel with the semiconductor 1 and the avalanche diode 6. The resistance 9 is used so that a lower voltage operating relay can be used which, among other things, has excellent operating characteristics.

If the back current passing through the avalanche diode 7 exceeds the current rating of the fuse 8, this fuse will burn out and require the avalanche diode 6 to be replaced because the fuse is constructed within the envelope of the avalanche diode 6.

The CR relay, being of materially lower voltage than will drop out at a voltage across the power semiconductor 1, will drop out at a voltage drop across the avalanche diode even though the latter maintains a fairly high voltage after the avalanche of current flow has been actuated. The current that is required to blow the fuse 8 is such that it will drop the voltage so that the CR relay will open and in this type of circuit the avalanche diode 6 is replaced and the circuit is again energized by closing the CR relay with the mechanical operating arm 10. Since the CR relay is de-energized and the front contact 5 of the primary circuit is open, no energy can be passed to the primary 4 to energize the circuit. This permits the operator to replace the avalanche diode 6 and reset the CR relay 10 into operation by lifting the actuating lever 10.

Figure 2:
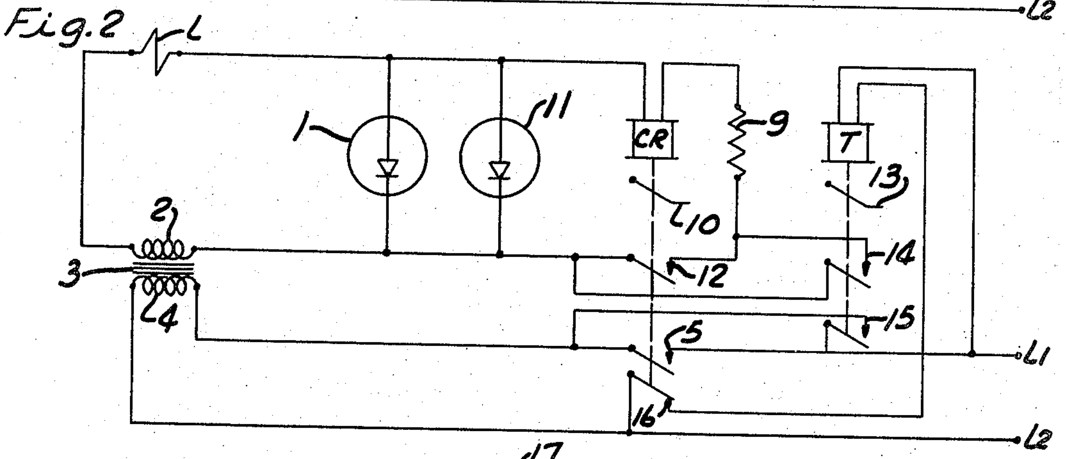
FIG. 2 is a circuit diagram of an avalanche diode connected in parallel with a power semiconductor, a relay and a circuit restoration timer.

In the circuit shown in FIG. 2 the load L is connected in the same manner with respect to the secondary 2 and the power rectifier or semiconductor 1 and in this instance the avalanche diode 11 has no fuse built therein. However, the CR relay, having its operating coil in series with the resistance 9, is connected in multiple through its own front or stick contact 12.

The timer T as shown in this circuit is provided with a manual reset lever 13 and this timer is provided with two front contacts 14 and 15 which are connected in parallel with the contacts 12 and 5 respectively. Thus when the timer is operated it will function to close its contacts 14 and 15 in multiple with the respective contacts 12 and 5 of the CR relay thereby energizing this circuit which energizing is sufficient to close the CR relay and the contacts 12 and 5 then continue the circuit from lines 1 and 2.

This CR relay is provided with the back contact 16 which connects line 2 to one side of the timer, the other side of the timer being connected to line 1.

In the circuit of FIG. 2 when lines 1 and 2 are energized the timer becomes energized and after a predetermined time this timer will close its contacts 14 and 15 momentarily which contacts are respectively in parallel with the contacts 12 and 5 thereby completing the circuit. Thus the timer T is enabled to energize the secondary circuit and supply the load with unidirectional current through the power rectifier 1. If it is desired to forego the time period of the timer relay T, the manual operating lever 13 is provided to lift the armature and engage the contacts 14 and 15 to immediately complete the circuit irrespective of the time.

The avalanche diode 11 in this instance is selected so that upon a predetermined voltage it will allow the normally small back current to increase tremendously in flow which will shunt the current to the CR relay causing it to drop out. As soon as this drops out the back contacts 16 of the CR relay energizes the timer and after a predetermined setting the front contacts 14 and 15 of the timer T are closed and which are respectively in parallel with the contacts 12 and 5 for the purpose of re-energizing the CR relay. If the CR relay is re-energized by this pulse, then it remains closed and the circuit again functions normally.

If, however, the avalanche diode 11 had a sufficient high voltage impressed thereon to create such a high back current so as to burn out this semiconductor then a short remains in the avalanche diode 11 and one cannot get the CR relay to close and after so many impulses in operation the timer relay will open its own circuit as this timer requires a manual reset with the lever 13 after so many operations.

Figure 3:
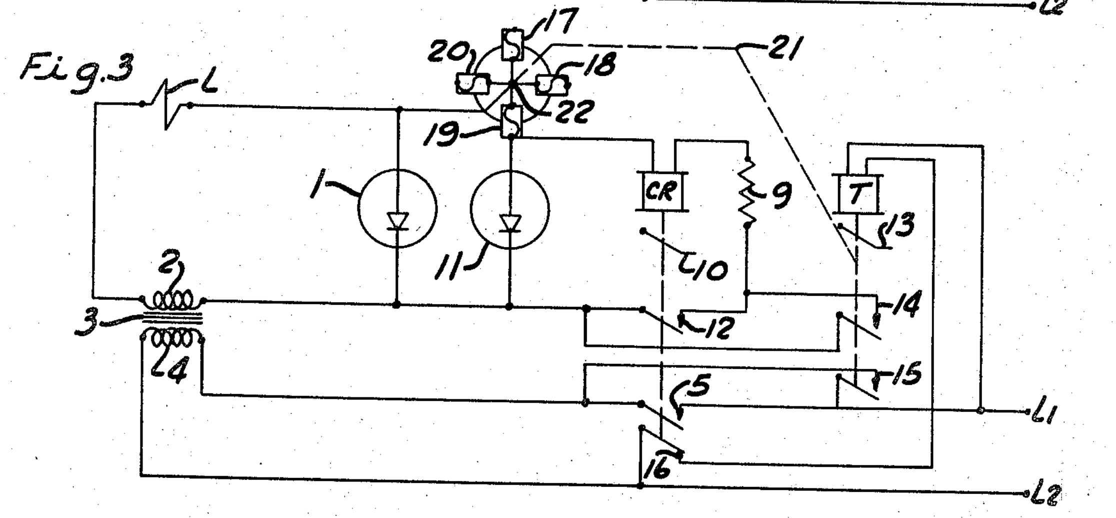
FIG. 3 is a circuit diagram of an avalanche diode having an external series fuse and connected in parallel with a power semiconductor, a relay and a restoration timer.

In the circuit shown in FIG. 3 the structure is precisely the same as that illustrated in FIG. 2 with the exception that one of a series of fuses 17, 18, 19 and 20 are arranged to be independently connected in series with the circuit of the avalanche diode and the CR relay connected in parallel. Each of the series of fuses 17 through 20 may be made progressively larger or selectively different. In any event, each of the fuses will normally stand the very low back current of the avalanche diode 11 together with the current normally required to operate the relay CR. The different fuses 17 through 20 may be changed by the operation of the timing relay T as indicated by the dotted instruction line 21.

Thus if the avalanche diode 11 receives a back voltage at the precise avalanche current characteristic, it will allow a large back current to flow causing the CR relay to drop out of service, under which circumstances the contact 16 becomes closed to energize the timer T. When the timer operates through its cycle and closes contacts 14 and 15 which are respectively in multiple with the contacts 12 and 5 the latter re-energizes the circuit after the proper timing cycle, which closes the CR relay and contacts 12 and 5 and the circuit again becomes normally operated and the CR contact 16 de-energizes the timer relay T.

If, however, the current is sufficient not only to cause the CR relay to drop out, but also to burn out the respective fuse in the series, the CR relay cannot close and thus after a predetermined time the timer will cease to function and then drop out. The next time the timer is energized in its cyclic periods to close contacts 14 and 15, it also changes consecutively the fuse such as rotating fuse 19 out of the path and putting fuse 20 in the circuit, current traveling from either the CR relay or the avalanche diode in multiple and thence passing through the newly positioned fuse 20 to line 22 and thence to the load L to complete the circuit.

Thus the timer T is endowed with a cyclic operation and after so many periods of operation, if the circuit fails to become energized, then the timer drops out as in the case of a circuit disclosed in FIG. 2.

The avalanche diodes 6 and 11 may be chosen to have any specific fuse rating. They are rated as a voltage sensing fuse of so many watt seconds capability. The watt second capability of the avalanche diode is a function of its design and construction. Thus when the maximum transient capability of the load is known, one selects a diode whose voltage and watt second limits are within the maximum limits specified for the load.

The timer T would, of course, be selected accordingly. It may be chosen to function just a few cycles after the closing of the back contact of the CR relay and in this manner provide a very short interruption in the operations of the load circuit which could well be within one second time.

If the timer T has been actuated a sufficient number of times to use up all of the fuses in the series, it will then open its circuit requiring a hand reset with the lever 13.

If, of course, the back voltage or the voltage overload in the blocking direction is sufficiently great to rupture the avalanche diode, the latter will become shortcircuited and will prevent the relay CR from becoming energized.

If on the other hand, voltage overload in the blocking direction is extraordinarily high to ruin the avalanche diode by actually burning it up leaving an open circuit diode, the CR relay will function at the same voltage and any protective fuse in the diode circuit will burn out due to the increase in current. This will cause the CR relay to de-energize and the power to the circuit being protected will be cut off.

Figure 4:
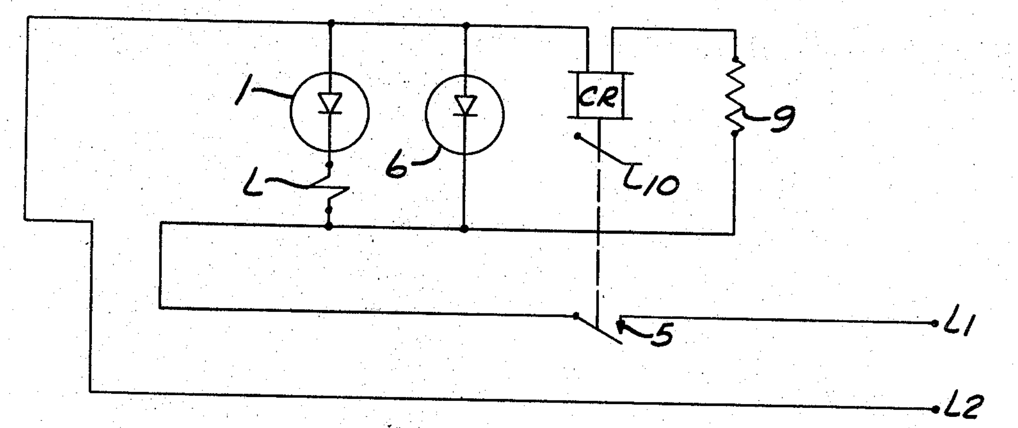
FIG. 4 is a circuit diagram of an avalanche diode connected in parallel with a power semiconductor and load in series and a hand reset relay having its operating coil connected in parallel with the avalanche diode and a contact thereof in the supply circuit.
Figure 5:
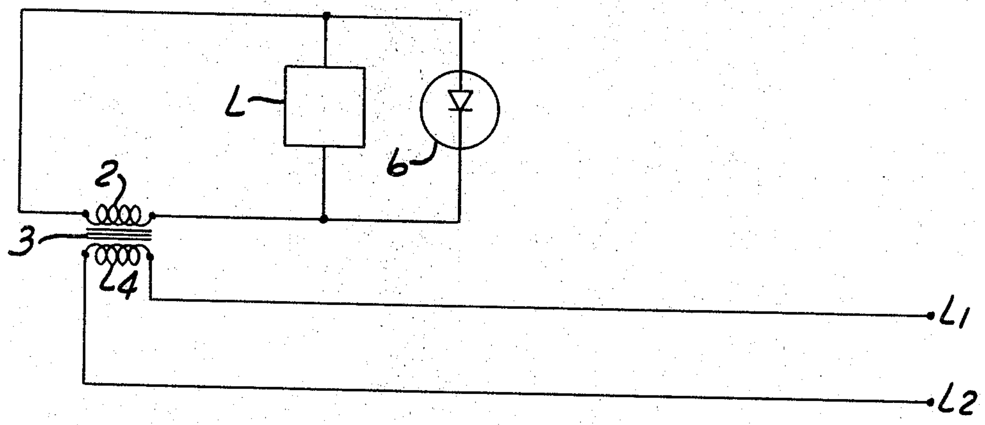
FIG. 5 is a circuit diagram of an avalanche diode connected in parallel with a load, all connected in series with the secondary winding of the transformer.
Figure 6:
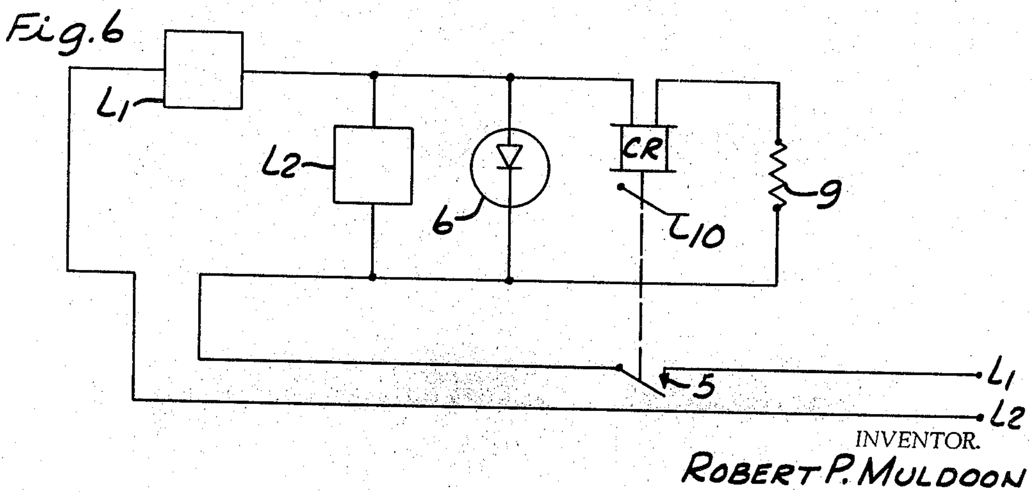
FIG. 6 is a circuit diagram of an avalanche diode connected in parallel with one part of a load and a hand reset relay, and all these components connected in series with the second part of the load with a contact of the relay in the supply circuit.

FIGS. 4, 5 and 6 show further embodiments of this invention to demonstrate the practical use of this voltage sensing fuse not only for particular components included in a load, but for the protection of a load per se.

FIG. 4 is similar to FIG. 1 except that no transformer or fuse 8 is employed. The load L is connected in parallel with the avalanche diode 6 as well as the semiconductor 1. The principle of operation in this circuit is the same as that shown in FIG. 1 except that here the load L and the semiconductor 1 are both protected from voltage and current overloads when the voltage and watts second rating of the avalanche diode 7 is approached or obtained.

FIG. 5 is a modification of FIG. 1 and shows an avalanche diode 6 in parallel with any type of load L. The load L could be an electrical alternating current motor, an amplification system, electrical typewriter or an electrical appliance found in the home such as toasters, mixers, lights, or any other electrically operated mechanism whether operated on D.C. or A.C. current. No CR relay is shown in this view for it is intended to show the invention herein in its simplest form. This circuit would prevent the load from beng destroyed by allowing the avalanche diode to maintain a short circuit leaving any overload in current in the primary circuit connected to lines L1 and L2.

FIG. 6 is a modification of FIG. 5 in that the load is divided to form load L1 and load L2. Load L2 is placed in parallel with the avalanche diode 6 and the operating coil of the CR relay is placed in parallel with the avalanche diode 6. In this circuit the load L2 is intended to be protected as against the load L1. It should be understood that in this view the load L1 is indirectly protected through the CR relay. Any surge of high current which causes the diode 6 to conduct current will short circuit almost all, if not all, the current passing through the load L2, which causes an appreciable reduction of current flow through the CR relay coil. Any overload of current whether an instant surge of energy or a surge of long duration will affect the load L1 momentarily causing the relay CR to de-energize due to the loss of sufficient operating voltage and in turn causing the front contact 5 to open the primary circuit which is connected in the line circuit L1 and L2. Therefore, the load L2 is instantaneously protected from any voltage or current overload whereas the components found in load L1 would not be so sensitive to such an overload and do not have to be placed within the direct protective circuit.

The CR relay shown in the drawings may be selected to operate on a low voltage in order to obtain selective operating characteristics. This type of relay is also selected so that it will de-energize quickly when the voltage is reduced on its operating coil to open the circuit in a fraction of a second.

The transformer 3 shown in some of the figures demonstrates that many types of loads operate on a lower voltage than the line voltage circuits that supply the particular load involved.

I claim:

1. A protection circuit for semiconductors against overloads which consists of a transformer having a primary line circuit and a secondary load circuit, power semiconductor means in the load circuit to supply unidirectional current thereto, avalanche diode means in parallel with said power semiconductor means, a relay having an operating coil means, two front contacts, a series circuit of said operating relay coil means and one front contact connected in parallel with said avalanche diode means, said second front contact of said relay connected in series with said primary winding and the source of power, and reset means for said relay including a back contact on said relay and a timer having an operating coil and two front contacts connected in parallel with said relay front contacts, the operating coil of said timer connected to the source of power through said relay back contact to energize the same.

2. The protection circuit of claim 1 wherein a selective rotary fuse wheel having a multiplicity of fuses thereon each to be connected in turn in series with said avalanche diode and said relay when said reset means is actuated.

References Cited by the Examiner

UNITED STATES PATENTS

| | | | |
|---|---|---|---|
| 2,961,553 | 6/1959 | Giger | 307—88.5 X |
| 3,047,742 | 7/1962 | Greening et al. | 307—88.5 X |
| 3,187,224 | 6/1965 | Massena | 317—16 |
| 3,187,225 | 6/1965 | Mayer | 317—33 |

OTHER REFERENCES

Silicon Zener Diode and Rectifier Handbook, Motorola Inc., Phoenix, Ariz., 1961; pp. 75, 79, 80, 84, 87, 90 and 91.

MILTON O. HIRSHFIELD, *Primary Examiner.*

R. V. LUPO, *Assistant Examiner.*